United States Patent [19]
Jones

[11] Patent Number: 5,979,908
[45] Date of Patent: Nov. 9, 1999

[54] PIPE SEAL FOR CONCRETE STRUCTURES

[76] Inventor: William D. Jones, 803 Monaco Dr., Warrington, Pa. 18976

[21] Appl. No.: 08/895,174

[22] Filed: Jul. 16, 1997

[51] Int. Cl.⁶ .................................................... F16L 17/02
[52] U.S. Cl. .............................. 277/604; 52/21; 285/230; 277/606; 277/616
[58] Field of Search ..................................... 277/606, 604, 277/602, 616, 626; 52/19, 20, 21; 285/230

[56] References Cited

U.S. PATENT DOCUMENTS

| | | | |
|---|---|---|---|
| 3,759,280 | 9/1973 | Swanson | 52/21 X |
| 4,073,048 | 2/1978 | Ditcher. | |
| 4,103,901 | 8/1978 | Ditcher. | |
| 4,159,829 | 7/1979 | Ditcher. | |
| 4,333,662 | 6/1982 | Jones. | |
| 4,350,351 | 9/1982 | Martin | 285/230 X |
| 4,508,355 | 4/1985 | Ditcher. | |
| 4,746,127 | 5/1988 | Westhoff et al. | 52/20 X |

*Primary Examiner*—Lynne A. Reichard
*Assistant Examiner*—John R. Cottingham
*Attorney, Agent, or Firm*—Howson and Howson

[57] ABSTRACT

Apparatus including an elastomeric gasket and a rigid holder therefor for resiliently connecting a sewer pipe in the wall opening of a concrete manhold to prevent leakage through the connection under extreme conditions of ground settling and overhead loading. The base of the gasket is anchored in the opening with its interior surface in flush alignment with diverging surfaces of the wall opening and having an inside diameter substantially corresponding to the outside diameter of the pipe for a press fit. The holder is preassembled with the gasket for casting of a port in a wall in situ.

1 Claim, 2 Drawing Sheets

PIPE SEAL FOR CONCRETE STRUCTURES

FIELD OF THE INVENTION

The present invention relates generally to sealing underground pipe and concrete wall joints; and more particularly, to an improved apparatus suitable for embedding in a concrete wall opening to maintain a positive seal around the outside of a pipe installed in the opening.

BACKGROUND OF THE INVENTION

The present invention represents an improvement over sewer pipe gaskets embedded in precasted wall openings or ports of underground concrete structures, such as in manholes, or embedded in concrete walls poured at construction sites. A common concern in sewer construction is the potential for leakage around a gasket joining an underground pipe and a wall opening after the connection and backfilling have been completed. ASTM Standards have addressed this concern by establishing certain performance requirements for flexible watertight joints in circular concrete sewer and culvert pipe and in precast manhole sections using rubber gaskets for sealing the joints. In particular, ASTM Standard Specification C443-94 requires there be no leakage under a hydrostatic pressure of 10 psi (23 feet head) for a period of 10 minutes with the pipe deflected in shear to create a position one-half inch wider than the assembled position on one side of the outside perimeter. Under the same pressure conditions, ASTM Standard Specification C923-84 requires there be no leakage with the pipe in axial deflection of at least seven degrees in any direction, and under a specified loading in shear. Although ASTM Standards are met under the prescribed test conditions, during installation or after extended usage the pipe may become out-of round, shift within the opening, or bottom out due to backfilling, ground settling, overhead traffic and similar transverse loads on the pipe. The clearance between the pipe and one side of the pipe narrows and compresses the gasket while the clearance on the opposite side widens allowing the gasket to relax thereby weakening its ability to withstand leakage.

Various gasket configurations have been used or proposed to eliminate the problem but with only limited success. Their designs do not maintain a good seal under extreme conditions often occurring in certain sewer installations. For example, the resilient gasket described in U.S. Pat. No. 4,333,662 consists of an annular base partially embedded in the wall opening of a precast manhole. A hollow O-ring extending from the base by a continuous radial web receives the pipe around its periphery. Any load on the pipe which deflects the pipe transversely will compress the gasket on the one side between the pipe and the wall and displace air confined in the O-ring to the other side where it can expand the O-ring into tighter contact between the pipe and the wall to maintain the seal. Other patents similarly disclose gaskets with hollow O-rings extending from embedded bases in which the ring can be injected with a material under sufficient pressure to expand it into closer contact with the pipe. Instead of a hollow ring, another known gasket configuration employs a solid O-ring extending from an embedded base by a resilient pleat-like web. Obviously, the amount the pipe can deflect or bottom out and still enable such gaskets to maintain a positive seal around the side of the pipe of widened clearance is limited.

Gaskets as above-described are embedded in the perimeter of wall openings at the time the concrete sections are poured. Typically, a pair of dish-like gasket retainers, such as shown in U.S. Pat. No. 4,333,662, are arranged back-to-back and gripped against opposite sides of the gasket by bolts or lugs extending through the retainers. With the retainer held between opposite sides of the concrete form where an opening is to be located, concrete is poured into the form and around the gasket and retainer thereby embedding the base of the gasket around the interior surface of the wall opening.

These fixtures are used primarily to embed gaskets in sewer structures precasted at a fabricator's facilities. However there is a need for a fixture which makes it possible for the gasket to be easily embedded in a concrete wall poured at a construction site.

SUMMARY OF THE INVENTION

Accordingly, it is an object of the present invention to provide a novel apparatus which will resiliently connect a sewer pipe in a wall opening of a concrete structure and prevent leakage through the connection under extreme conditions of ground settling and overhead loading.

Another object of the present invention is to provide an apparatus for maintaining a resilient hydrostatic seal over an extended period of time between a pipe and the opening in a concrete structure.

Still another object of the present invention is to provide a novel apparatus configured for positive embedment in the opening of a precast concrete wall.

A further object of the present invention is to provide novel apparatus for embedding a gasket in a concrete wall opening for a pipe at a construction site.

A still further object is to provide a reliable apparatus for sealing the joint of a pipe and opening of a concrete structure which is relatively inexpensive to manufacture and easy to install.

These and other objects and novel features of the invention are accomplished with an apparatus including an annular gasket molded or extruded of elastomeric material for casting in a port in a precast hollow concrete structure to seal any space between the port and the adjacent perimeter of a pipe. The gasket comprises a solid toroid or O-ring coaxially disposed within an annular base by a continuous radial web which allows the O-ring to flex relative to the base. Exposed interior surfaces of the base diverge symmetrically from opposite sides of the web in flush alignment with diverging surfaces of the port and terminate in radial flanges with ends inturned to form a continuous exterior channel in the periphery of the gasket. The large labrynthine surface area formed thereby positively anchors the gasket in the concrete when poured with the interior surfaces of the base and the port flush, as well as blocks water from seeping across the port-gasket interface.

The apparatus further includes a novel holder in combination with the gasket for embedment in a concrete wall poured in situ. It includes a pair of symmetrically opposed diverging members contiguous with the diverging surfaces of the base of the gasket as above-described. The proximal ends of the members abut opposite sides of the web, and the distal ends terminate in radial flanges which are positioned between facing sides of a wall form where a wall port is to be located. Elastic bands, stretched between the flanges, hold the members in place against the gasket and are left in place with the members after the wall is poured.

BRIEF DESCRIPTION OF THE DRAWINGS

The foregoing and other objects, novel features and advantages of the present invention will become apparent from the following description when taken in conjunction with the accompanying drawings, in which.

DESCRIPTION OF THE PREFERRED EMBODIMENTS

Figure 1:
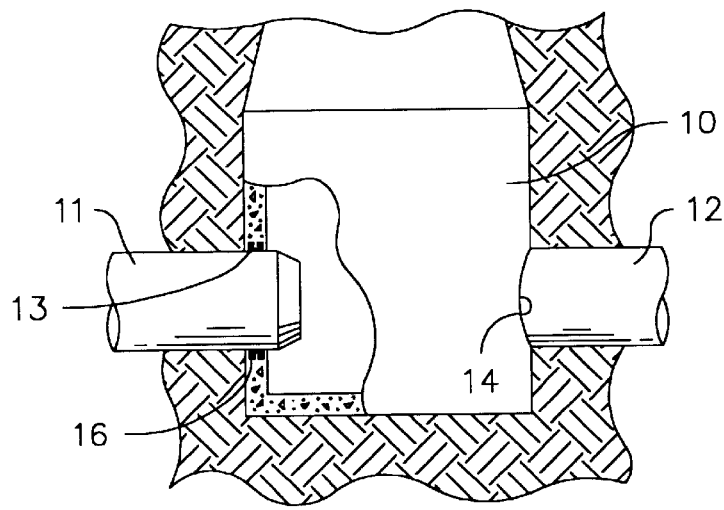
FIG. 1 is a view in elevation and partial cross section of the lower portion of a manhole hydrostatically sealed to sewer pipes by gaskets according to the present invention.

Referring now to the drawings wherein like reference characters designate like or corresponding parts throughout the several views, FIG. 1 illustrates the lower portion of an underground precast concrete manhole 10 with a hollow interior communicating between ends of sewer pipes 11 and 12 inserted, respectively, through ports 13 and 14. Each port has symmetrically diverging surfaces such as surfaces 13a. The pipes are generally made of PVC or ductile iron. An elastomeric gasket 16, according to the invention, is embedded in interior surface of port 13 and compressed in fluid sealing relation around the perimeter of pipe 11. An identical gasket, not shown, provides a seal around pipe 12.

Figure 2:
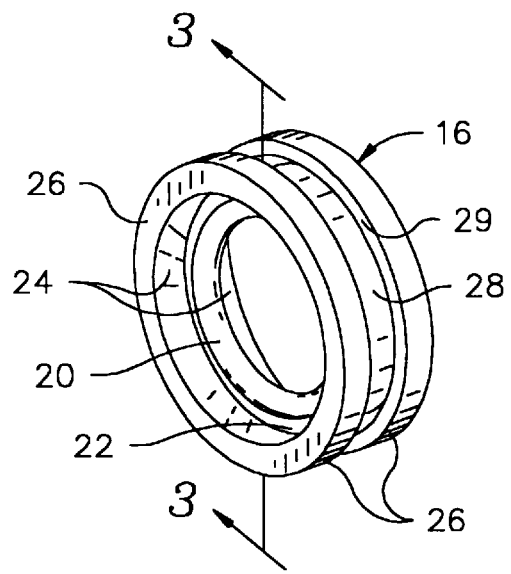
FIG. 2 is a pictorial representation of a gasket of FIG. 1.

A more detailed view in FIG. 2 shows gasket 16 in an unstressed state prior to being embedded in port 13. For small OD pipes, such as 4" to 8", the gasket may be molded in annular form; but in larger size pipes, the gaskets are usually extruded, cut to the desired size, and the ends bonded and vulcanized together.

Figure 3A:
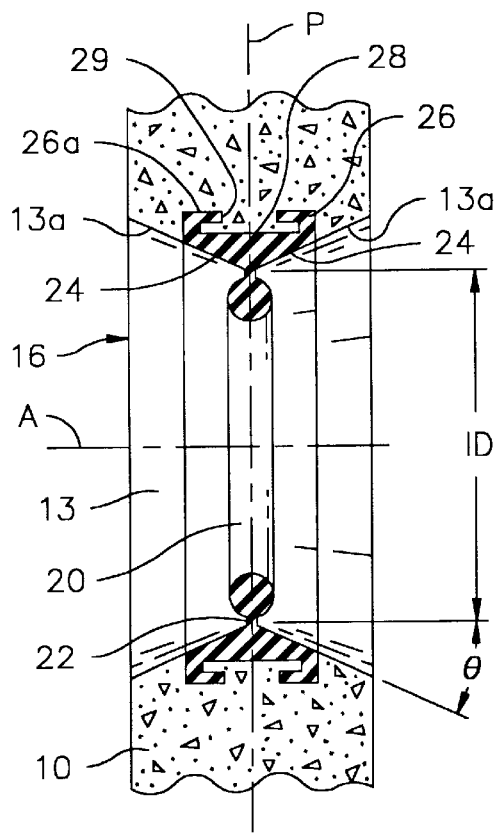
FIGS. 3A and 3B are cross sectional views of the gasket taken in a plane along the line 3—3 of FIG. 2.

FIG. 3A shows gasket 16 with an annular base 18 embedded in port 13, without pipe 11 inserted. In the unstressed state, gasket 16 includes a solid O-ring or toroid 20 integrally connected to base 18 through a continuous web 22 radially extending from toroid 20. Base 18 defines a pair of interiorly exposed surfaces 24 diverging symmetrically from opposite sides of web 22 in flush alignment with respective diverging surfaces 13a. Exposed surfaces 24 terminate in radial flanges 26 having ends 26a inturned toward each other from opposite sides of base 18 to form a channel 28 with a narrow opening 29 around the gasket perimeter. This configuration provides a large contact area for preventing dislodgement of gasket 16 in port 13 and a labrynthine water block against seepage across the port-gasket interface.

Figure 3B:
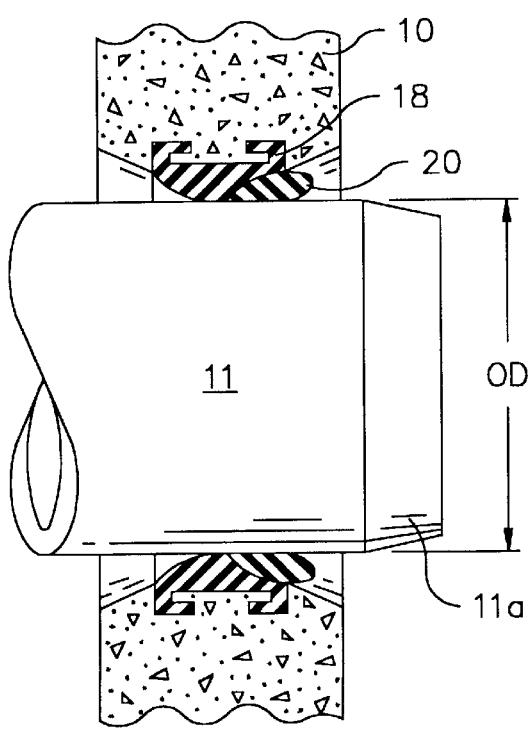
Figure 4:
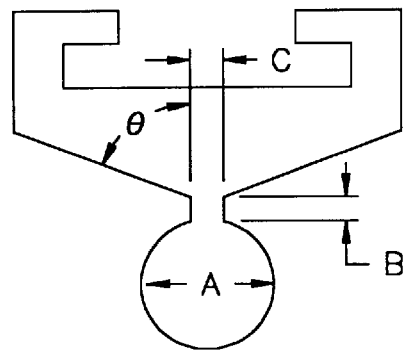
FIG 4 identifies dimensional criteria for designing the gasket of FIG. 2.
Figure 5:
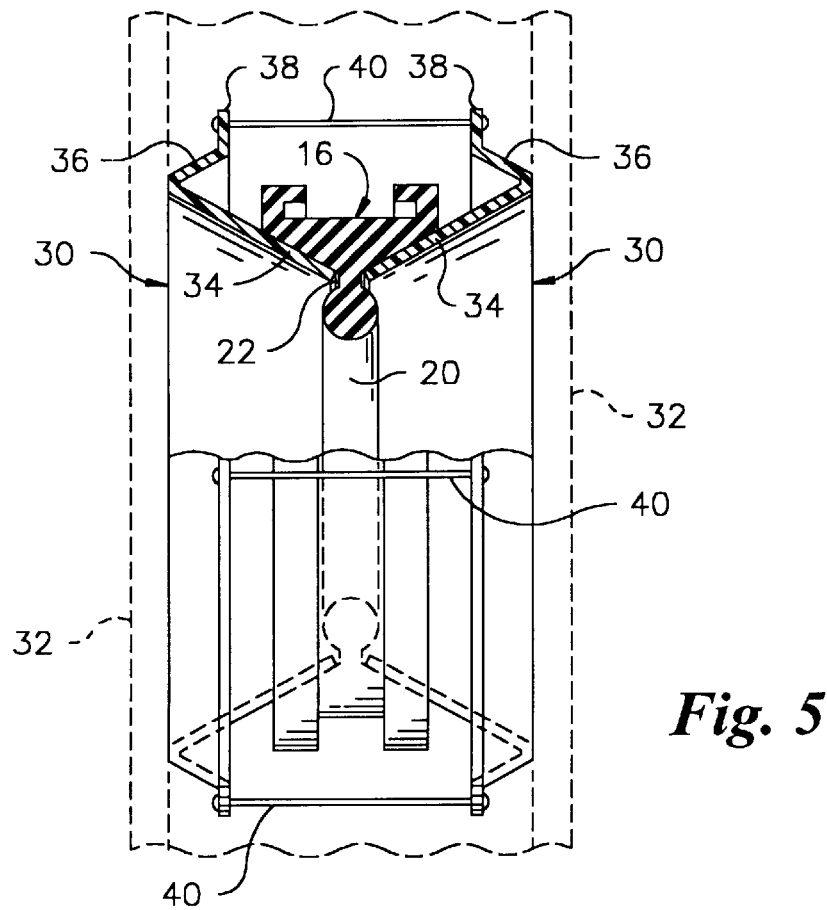
FIG. 5 is a view partially in cross section of an apparatus according to the invention of a holder in combination with the gasket of FIG. 2.

The inside diameter (ID) of base 18, where it joins web 22, corresponds substantially to the outside diameter (OD) of pipe 11 to ensure a press fit past web 22 and toroid 20. These criteria determine the design parameters, shown in FIG. 4, for web length B and thickness C and toroid diameter D for a divergence θ of surface 24 in order for pipe 11, when inserted, to compress toroid 20 into the annular space between pipe 11 and the facing surfaces 24 and 13a and form a positive hydrostatic seal as shown in FIG. 3B. The pipe is preferrably beveled at end 11a and lubricated to ease insertion.

Transverse displacement of pipe 11 in one direction such as bottoming out is substantially reduced by the resistance of the elastomer in base 18 while web 22 and toroid 20 decompress to maintain a fluid seal. Typical dimensions for several ranges of gasket size, determined by experimentation and testing, are given by example and not by limitation in the following table for a gasket made of a blend of polyisoprene and SBR of 50 Shore durometer hardness. Variations are contemplated depending on choice of materials, port configurations, etc.

| Base ID Range | θ Divergence | A Ring OD | B Web Length | C Web Thickness |
|---|---|---|---|---|
| 4" to 8" | 70° | 0.500" | 0.125" | 0.0875" |
| 8" to 15" | 70° | 0.718" | 0.157" | 0.094" |
| 15" and above | 70° | 1.000" | 0.312" | 0.125 |

A fixture for embedding a gasket of the type described in precasted concrete structures is described in U.S. Pat. No. 4,333,662, supra. The fixture includes a pair of mounting rings for securing to opposite sides of the gasket such as by bolts or a key and slotted bracket. The outer edges of the mold ring are shaped to fit contiguously between the facing sides of a concrete mold. Each time a gasket is precasted in a concrete structure, the fixture and gasket are assembled before placement in the mold. After the concrete has been poured and set, the mold rings must be removed.

The present invention provides a preassembled gasket and holder apparatus which is permanently embedded during precasting of a concrete wall in situ. A pair of identical holders 30 secure gasket 16 in place between facing sides of concrete wall forms 32 (shown in dotted outline). Holders 30 have diverging frustoconical sections 34, and are preferrably molded of polypropylene in a thickness of approximately 0.0625 inches contiguous with surfaces 24 (FIG. 3A). The inner proximal ends of the section abut respective sides of the neck or web 22, and the outer distal ends angle inwardly to form sections 36 which terminate in radial sections 38. The distance between the distal ends of sections 34 and between facing sides of wall form correspond. Holders 30 are held in place against base 24 and/or web 22 by elastic bands 40 stretched between sections 38 at spaced intervals around the perimeter. The entire assembly is left in the port or opening thusly formed after the wall is poured.

Some of the many advantages and novel features of the invention should now be readily apparent. For example, a gasket is provided which resiliently connects a sewer pipe to an underground concrete structure without leakage through the connection under relatively severe conditions of ground settling and overhead loading. Any transverse deflection of a pipe relative to a port of a structure in which it is inserted is minimized. Any bottoming out or compression of the gasket on one side between the pipe and the wall is compensated by expanding the gasket on the opposite side while retaining a high compression fitting. A preassembled gasket and holder apparatus is also provided for in situ construction of pipe access openings in a concrete wall or foundation.

It will be understood, of course, that various changes in the details, materials, steps and arrangement of parts, which have been herein described and illustrated in order to explain the nature of the invention, may be made by those of skill in the art within the principle and scope of the invention as expressed in the appended claims.

I claim:

1. An improved structure for maintaining a positive seal around a pipe, the improvement comprising:

a port in the structure, said port having coaxially diverging interior surfaces;

an annular gasket having a toroid, a web integral with and extending outwardly from said toroid, and an annular base surrounding said web and integrally joined to said web along the outer circumference thereof, said base being embedded around said port with exposed surfaces diverging from opposite sides of said web in flush alignment with the diverging surfaces of said port, the exposed surfaces of said base terminating in radial flanges at opposite sides positively embedding around said port, said flanges having ends angled inwardly to provide a large contact area for preventing dislodgment of said base from said port and a labrynthine water block across the interface of said base around said port, said base having an inside diameter at the junction of said web with said base corresponding substantially equal to the outside diameter of the pipe, and said gasket having resilience for effecting compression of said toroid and said web completely into an annular space formed between the pipe and said interior surfaces around said port and said base when the pipe is inserted; and a holder including a pair of opposed frustoconical members with diverging sides contiguous with a respective one of said exposed surfaces of said base, said members having proximal ends abutting a respective one of the web sides, and distal ends abutting a respective one of the facing sides of a concrete mold, said distal ends being angled inwardly and terminating in radial flanges, and an elastomeric element connected in tension between said flanges holding the proximal ends of said members against said web sides.

* * * * *